United States Patent
Wang et al.

(10) Patent No.: US 12,337,883 B2
(45) Date of Patent: Jun. 24, 2025

(54) TRACK MONITORING SYSTEM

(71) Applicant: FNV IP BV, Leidschendam (NL)

(72) Inventors: Haoyu Wang, Leidschendam (NL); Adrianus Franciscus Wilhelmus Berkers, Leidschendam (NL); Luke William Moth, Leidschendam (NL)

(73) Assignee: FNV IP B.V., Leidschendam (NL)

( * ) Notice: Subject to any disclaimer, the term of this patent is extended or adjusted under 35 U.S.C. 154(b) by 799 days.

(21) Appl. No.: 17/615,604

(22) PCT Filed: Jun. 5, 2020

(86) PCT No.: PCT/NL2020/050369
§ 371 (c)(1),
(2) Date: Dec. 1, 2021

(87) PCT Pub. No.: WO2020/246890
PCT Pub. Date: Dec. 10, 2020

(65) Prior Publication Data
US 2022/0306169 A1 Sep. 29, 2022

(30) Foreign Application Priority Data
Jun. 7, 2019 (NL) ..................................... 2023276

(51) Int. Cl.
*B61L 23/04* (2006.01)
*B61K 9/08* (2006.01)
(Continued)

(52) U.S. Cl.
CPC .............. *B61L 23/042* (2013.01); *B61K 9/08* (2013.01); *B61L 25/025* (2013.01); *B61L 27/40* (2022.01);
(Continued)

(58) Field of Classification Search
CPC ....... B61K 9/08; G01S 17/89; B61L 2205/04; B61L 23/042; B61L 23/044;
(Continued)

(56) References Cited

U.S. PATENT DOCUMENTS

| 8,412,393 B2 * | 4/2013 | Anderson | B61L 23/042 |
| | | | 701/19 |
| 2010/0004804 A1 * | 1/2010 | Anderson | B61K 9/08 |
| | | | 701/19 |

(Continued)

FOREIGN PATENT DOCUMENTS

| AU | 2017232219 A1 * | 4/2019 | |
| WO | WO-0189904 A1 * | 11/2001 | ........... B61L 15/0081 |
| WO | 2018208153 A1 | 11/2018 | |

OTHER PUBLICATIONS

International Search Report and Written Opinion for PCT/NL2020/050369, dated Sep. 18, 2020, 9 pages.
(Continued)

*Primary Examiner* — S. Joseph Morano
*Assistant Examiner* — Cheng Lin
(74) *Attorney, Agent, or Firm* — Polsinelli PC

(57) ABSTRACT

A track monitoring system (and a method thereof) for mounting to a vehicle on a track comprising at least one rail is provided. The track monitoring system comprises a position and attitude measurement unit configured to determine a geographical position and attitude of the system during at least one pass of the vehicle on the track, a storage medium for storing track geometry data, a laser imaging and/or scanning unit configured to determine a position of the at least one rail relative to the track monitoring system, and a position of the at least one rail and surroundings relative to the track monitoring system during the at least one pass, a processor configured to determine, in the at least one pass, a first geographically referenced rail position based on the (Continued)

geographical position and attitude of the rail monitoring system and the position of the at least one rail relative to the system, determine, in the at least one pass, a second geographically referenced rail position based on the geographical position and attitude of the rail monitoring system and the position of the at least one rail and surroundings relative to the rail monitoring system, determine a third geographically referenced rail position based on the first and the second geographically referenced rail positions, and corresponding geographically referenced track geometry data, acquire, in a further pass, track geometry data associated with each position of the rail relative to the rail monitoring system, and the output of the position and attitude measurement unit, update, based on the third geographically referenced position of the rail, the track geometry data acquired in the further pass, and store updated track geometry data to the storage medium.

14 Claims, 5 Drawing Sheets

(51) Int. Cl.
    *B61L 25/02*     (2006.01)
    *B61L 27/40*     (2022.01)
    *B61L 27/53*     (2022.01)
    *G01S 17/89*     (2020.01)

(52) U.S. Cl.
    CPC .............. *B61L 27/53* (2022.01); *G01S 17/89* (2013.01); *B61L 2205/04* (2013.01)

(58) Field of Classification Search
    CPC .... B61L 23/045; B61L 23/047; B61L 25/025; B61L 27/40; B61L 27/53
    See application file for complete search history.

(56) References Cited

U.S. PATENT DOCUMENTS

| | | | |
|---|---|---|---|
| 2012/0274772 A1* | 11/2012 | Fosburgh | G01C 11/04 348/149 |
| 2018/0057029 A1* | 3/2018 | Maurice | B61K 9/08 |
| 2018/0273060 A1* | 9/2018 | Corbin | G01P 15/14 |
| 2019/0039633 A1* | 2/2019 | Li | B61L 23/047 |
| 2020/0207389 A1* | 7/2020 | Moth | B61L 23/041 |

OTHER PUBLICATIONS

Examination Report No. 2 for Australian Application No. 202087819, dated Jan. 31, 2025, 3 pages.
Examination Report No. 2 for Australian Application No. 202087819, dated Apr. 15, 2025, 3 pages.

\* cited by examiner

TRACK MONITORING SYSTEM

FIELD

The present invention relates to railway infrastructure, and more particularly, to a track monitoring system suitable for mounting to a vehicle, e.g. a freight or passenger train.

BACKGROUND ART

It is indispensable to monitor conditions of railway tracks, or their constituting ties, rails etc. to ensure safety of operation over time. Tracks are exposed to wear and tear, and damage over time, for example, due to the physical stress caused by movement of trains, weather conditions, and other factors which damage the material of the track. Monitoring tracks on a regular basis helps identify such damage or degradation. This in turn enables effective maintenance of tracks, for example, without incurring additional costs due to damaged tracks which are beyond repair upon detection.

Over the recent years, a number of dedicated track inspection systems have become available in market. It is possible to manually operate a trolley with a GPS system and/or camera installation for inspecting different locations on a track, in order to detect rail irregularities/deformations. However, such inspection is costly, slow and requires the track to be free (i.e. not in use), in order for the method to be carried out by the operator.

Further, in addition to providing accurate measurements of a rail position in terms of a 3D string of its geospatial coordinates, it is important to monitor the track quality and safety in terms of parameters like the track gauge, longitudinal level, alignment, cant and twist, termed track geometry, to guide maintenance work. Methods to obtain accurate track geometry values include measuring a track multiple times and averaging the obtained track geometry results, or measuring track geometry at slow speeds, e.g. less than 20 km/h.

Due to the high acquisition costs, measurements are collected infrequently in most countries, normally, twice a year for assessing track quality and once every few years for obtaining the geographical position of the track.

A simultaneous measurement of the geographical position of the track and its geometry has been made feasible by incorporation of scanning and imaging equipment in combination with GNSS systems. However, the geospatial position of the track and track geometry (the track conditions) are treated as separate measurements in art, due to which their correlation has been less analyzed. Further, due to the inaccuracies in GPS signals, it has not been possible in art to use the geographical position data of the rail to improve track geometry values.

There is thus a need to study the correlation of the geospatial/geographical position of the track to its quality (or track profile/geometry), and use said correlation to monitor and update the quality of the track on a regular basis. There is a further need to be able to collect and update track geometry during a single pass of a vehicle moving at a high speed over its trajectory.

SUMMARY OF THE INVENTION

The present invention is aimed at overcoming at least one of the above disadvantages. Other advantages of the invention will become more apparent in the detailed description of the technical features.

According to an aspect of the invention, a track monitoring system (and a method thereof) for mounting to a vehicle on a track comprising at least one rail is provided. The track monitoring system comprises a position and attitude measurement unit configured to determine a geographical position and attitude of the system during at least one pass of the vehicle on the track, a storage medium for storing track geometry data, a laser imaging and/or scanning unit configured to determine a position of the at least one rail relative to the track monitoring system, and a position of the at least one rail and surroundings relative to the track monitoring system during the at least one pass, a processor configured to determine, in the at least one pass, a first geographically referenced rail position based on the geographical position and attitude of the rail monitoring system and the position of the at least one rail relative to the system, determine, in the at least one pass, a second geographically referenced rail position based on the geographical position and attitude of the rail monitoring system and the position of the at least one rail and surroundings relative to the rail monitoring system, determine a third geographically referenced rail position based on the first and the second geographically referenced rail positions, and corresponding geographically referenced track geometry data, acquire, in a further pass, track geometry data associated with each position of the rail relative to the rail monitoring system, and the output of the position and attitude measurement unit, update, based on the third geographically referenced position of the rail, the track geometry data acquired in the further pass, and store updated track geometry data to the storage medium.

DETAILED DESCRIPTION

Figure 1:
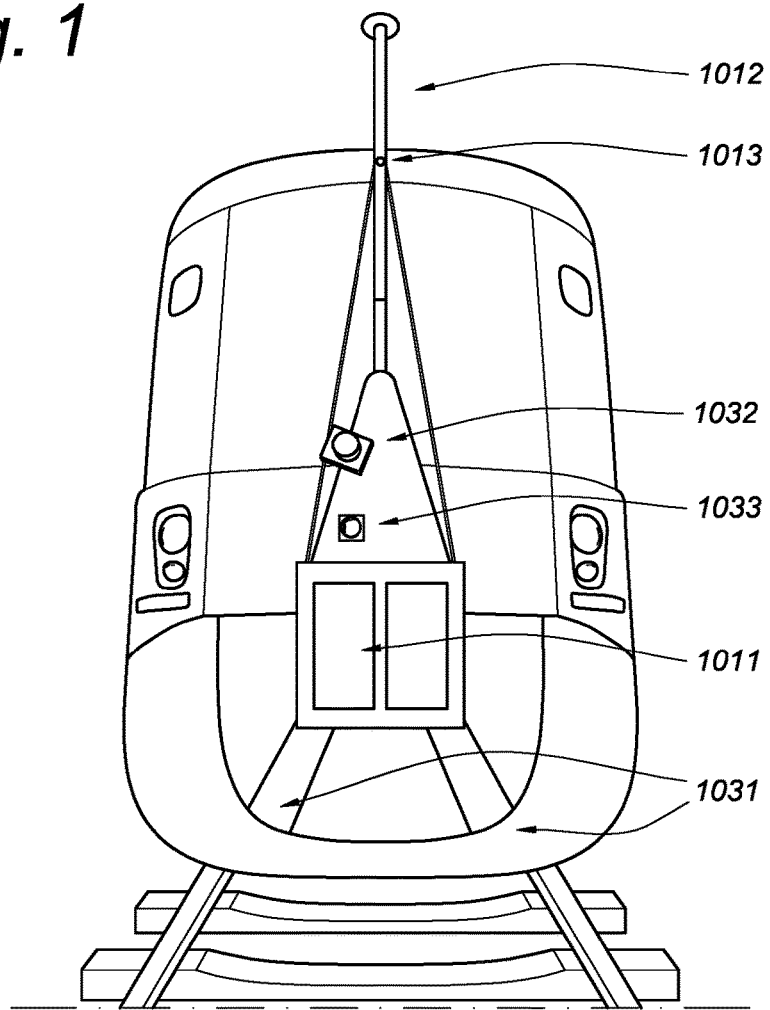
FIG. 1 shows the track monitoring system in a vehicle mounted position according to an embodiment of the present invention.

The matters exemplified in this description are provided to assist in a comprehensive understanding of various exemplary embodiments of the present invention disclosed with reference to the accompanying figures. Accordingly, those of ordinary skill in the art will recognize that various changes and modifications of the exemplary embodiments described herein can be made without departing from the scope of the claimed invention. In particular, combinations of specific features of various aspects of the invention may be made. An aspect or embodiment of the invention may be further advantageously enhanced by adding a feature that was described in relation to another aspect or embodiment of the invention.

Further, the functionality associated with any particular means may be centralized or distributed, whether locally or remotely. It may be advantageous to set forth that the terms "include" and "comprise," as well as derivatives thereof, mean inclusion without limitation. In addition, reference to an element by the indefinite article "a" or "an" does not exclude the possibility that more than one of the element is present, unless the context clearly requires that there be one and only one of the elements. The indefinite article "a" or "an" thus usually means "at least one".

The term "track" or "railway track" is understood as a structure comprising railroad ties (sleepers), rails fastened to the ties and ballast embedding said ties (or slab track), and the underlying subgrade. The track may further be understood as an aggregate of at least said parts which enable the movement of a vehicle on a multiplicity of surfaces of the track. The term "rail", although may be interchangeably used with a track in the description, is primarily understood as a constituting part of the track. Each rail may comprise an inner and an outer surface, wherein the inner surfaces of the rails face towards each other.

The term "rail head" is understood as an upper part of a rail which is disposed in contact with a vehicle as it traverses the track. The term "rail foot" is understood as a lower part of the rail which is disposed in contact with the ground. The rail head and rail foot may be connected to each other forming a single continuous surface.

The term "surroundings" may encompass regions situated around, or in a vicinity of, a rail or track. Surroundings may include objects or obstructions near the trajectory of the vehicle, and may also include an adjacent track.

A Cartesian coordinate system has been used to describe spatial coordinates/position data for exemplary embodiments of the present invention. An "x" coordinate may be used to denote a point in space which lies on an axis in a direction of the track, and may correspond to a direction of movement of the vehicle on the track. A "y" coordinate may be used to denote a point in space which lies on an axis perpendicular to an outer/inner surface of a rail. A "z" coordinate may be used to denote a point in space which lies on an axis perpendicular to the ground, and may be referred to denote the height of the rail measured from the ground. A "position" is understood as an aggregate of coordinates expressed in the x, y, z directions.

FIG. 1 shows the track monitoring system according to an embodiment of the present invention.

The track monitoring system may be configured as a single unit which can be mounted on a vehicle. The system may be attached to an outside part (e.g. front or rear) of a vehicle, e.g. a train, and comprises a position and attitude measurement unit 101, for measuring position data (including angular position/orientation) of the system, an inertial measurement unit (IMU) 1011 comprised as part of the position and attitude measurement unit for measurement of acceleration and rotation of the system, a storage medium or memory 102, a laser scanning and/or imaging unit 103 comprising at least a laser scanner 1031, including e.g. a 360 degree light detection and ranging (LIDAR) scanner 1032, to obtain distances/and orientation of the rail and/or surroundings (e.g. platform, vegetation, bridges) relative to the system and/or at least one image sensor or camera 1033 for acquiring images or motion pictures of the rail and/or surroundings. The laser scanning unit may comprise at least one laser for irradiating and collecting information of each rail constituting the track or/and that of the surrounding objects. The scanning unit is adapted to be rotatable over 360 degrees about its axis, so as to obtain ranging data corresponding to the vicinity of the railway track.

The track monitoring system further comprises a processor 104 for processing data acquired by the elements of the system, and a communication unit 105. The processor may be implemented as a central unit processing outputs corresponding to the position and attitude measurement unit and the laser scanning/and imaging unit, or as distributed units, processing each output separately. The positioning unit may comprise e.g. a global navigation satellite system (GNSS) transceiver/receiver 1012 for measuring the geographical position of the system. These GNSS unit may be attached to a mast/pole 1013 constructed of a rigid material like carbon fiber. The pole is adapted to protrude from a portion of the track monitoring system which houses the laser scanning and/or imaging unit, in a perpendicular direction to the track, and has a suitable length. The pole may be foldable for easy transportation.

The track monitoring system may be comprised within a single unit or as separate entities, and can be mounted on an outer section/part of the vehicle, e.g. it's front or rear end. Any suitable attachment means may be used to attach or couple the system to the vehicle. The vehicle may be equipped with a suitable coupler which is capable of coupling the system to the train, e.g. via a suitable adaptor. The installation of the unit is removable. The installation as well the detachment may be carried out in a time span of less than two minutes, which is readily achieved during a regular train stop. This reduces the need for special measurement trains or for additional train paths to be laid for enabling track measurements without disturbing normal train services.

As the vehicle reverses the track, the mounted system traverses the track with the vehicle. The below section details each component of the track monitoring system and describes a method for obtaining and updating track geometry data using data acquired by said components. The system may further be augmented with power units, and other operating and control systems (not shown) for the operation of the various elements/components of the system, as would be readily understood by those skilled in the art.

Figure 2:
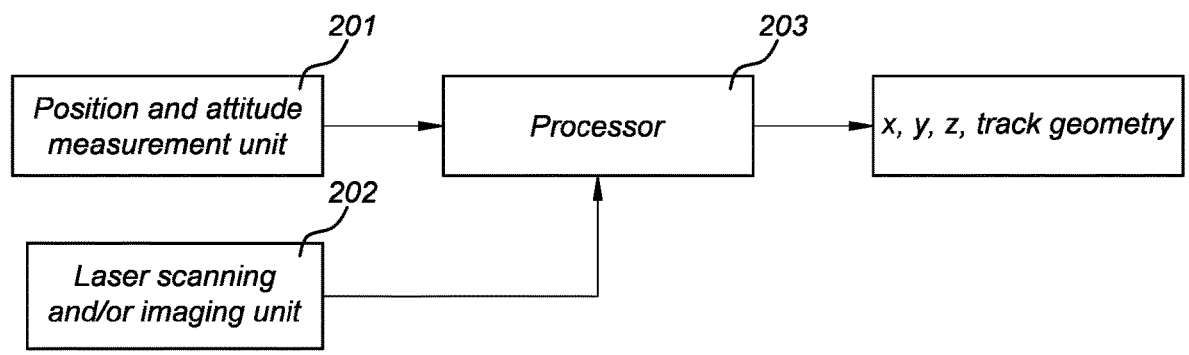
FIG. 2 shows a block arrangement of the components of the track monitoring system and a flow chart of the method according to an embodiment of the present invention.

FIG. 2 shows a block arrangement of the track monitoring system according to an embodiment of the present invention.

According to an embodiment, the position and attitude measurement unit 201 measures a geographical position of the system and/or vehicle on which it is mounted as the vehicle traverses the track. The position and attitude measurement unit may include the GNSS receiver/transceiver, comprising a global position system (GPS), for real time measurement of position. A GNSS antenna may be attached to the mast/pole at a predetermined position (height) for this purpose.

Without limitation to the examples, the GPS receiver may determine the 3D (x, y, z) coordinates of a position of the system in an interval of 15 m, preferably 10 m, and more preferably 8 m intervals between two measurement points. The data may also be collected at random intervals. The position and attitude measurement unit is capable of providing a geospatial position of the system while being coupled to a vehicle, e.g. a train, which moves at an average speed of 160 km/h.

In an embodiment, the position data determined by the GPS/GNSS receiver may be improved using data retrieved from a continuously operating reference station (CORS). Such correction improves accuracy of GPS measurements to +/−50 mm bandwidth.

On a moving vehicle, the position of a sensor is not uniformly fixed. A number of factors including vibration, shock, vehicle accelerations and movements, contribute to inaccuracies, which need to be taken into account while calculating the position of the system. In order to make meaningful/accurate rail or track geometry measurements, the effect of these various factors should therefore be cancelled out from the measured data.

In an embodiment, the position and attitude measurement unit comprises an inertial measurement unit (IMU) which detects rotation/acceleration of the vehicle. The IMU further controls the attitude of the system by controlling the orientation of the system with respect to an inertial frame of reference or another entity. The IMU includes a combination of inertial sensors, such as one or more accelerometers and one or more gyroscopes (e.g., vertical gyroscope, rate gyroscope), and the like. The IMU acquires velocity/acceleration data based on movement of the vehicle. With the IMU, the position of the track monitoring system can be corrected to an accuracy of +/−15 mm. Measurements of the IMU may be undertaken at an interval of 3 m, preferably, 1 m, and more preferably 0.1-0.3 m along the track, with an operation frequency of 200-500 Hz, preferably 300 Hz. As apparent to a skilled person, the GNSS and the IMU may be implemented as the same or separate entities in the invention.

In addition to position correction by measuring attitude of the track monitoring system, the IMU can also acquire data regarding pitch, roll, and yaw information of the vehicle, which can be used to determine track geometry parameters like grade, cant, longitudinal level, cross-level, track curvature, etc. Accurate and concurrent measurements of relative movements between the GPS sensor and the inspected track or rail are highly significant in obtaining a correct rail profile and track geometry measurements.

Figure 3A:
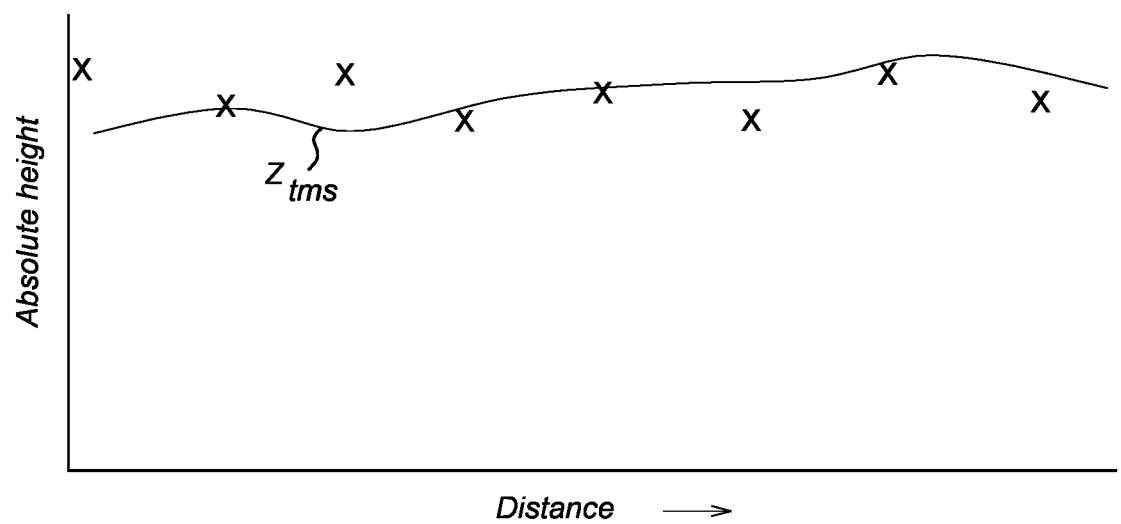
FIG. 3a shows an example of an absolute height (z) profile acquired by the track monitoring system in an embodiment of the invention.

The output of the positioning unit is fed to the processor which processes each measured geographical position of the system to obtain a position profile of the system along an expanse of the track or the trajectory of the vehicle. For example, FIG. 3a shows an illustration of how the absolute height (z) of the track monitoring system, $z_{tms}$, varies along the track.

The laser imaging and/or scanning unit 202, comprising imaging and/or scanning sensors is capable of capturing images and/or scanned data of each rail and/or surroundings as the vehicle traverses the rail tracks. A light detection and ranging (LIDAR) imaging sensor may be used. The imaging unit comprises at least one laser having predetermined characteristics (pulse width, intensity, power output etc.), and which operates in a suitable wavelength range. In a preferred embodiment, each laser comprised within the laser imaging and/or scanning unit is configured to project a beam on either rail, with the laser beam spot having an elliptical spatial cross-section. The elliptical beam illuminates a section of the track/rail along its y or/and z axes at a predetermined x coordinate, in a characteristic light sectioning method. The principle of light sectioning and its application in 3D topology measurements is obvious to a person skilled in the art, and hence omitted from further elaboration. Tunable lasers are especially useful to tune the laser emission characteristics. The imaging unit may incorporate either continuous wave (CW) or pulsed lasers, the radiation being continuous over time or intermittently. An ultraviolet range laser (e.g. excimer) is preferred to survey tracks, as interference from the visible wavelengths is minimized. Alternatively or in conjunction therewith, different individual sensors may be mounted in the imaging unit with wavelength filters to control the wavelengths of radiation detected by each sensor.

The laser(s) included in the imaging and/or scanning unit irradiates a rail and thereafter, a detector (e.g. a CCD camera, a photodiode) included therein detects e.g. the intensity of light reflected off the rail surface. Any reflection spectroscopy principle, e.g. time-of-flight (TOF), may be used therefor. The position of the rail relative to the system (distance from the system) is determined based on the radiation reflected off the surface of the rail. Each laser is configured to irradiate a point of interest on each rail. The reflected light is detected by a corresponding sensor, and analyzed with respect to the incident/emitted beam, to interpret the corresponding geometry of the reflecting surface(s), e.g. the rail.

The laser imaging and/or scanning unit further acquires high-resolution images of the rail profile using e.g. at least one camera, as the laser beam passes over the rail. The image provides a reference to the identity of the object under measurement (e.g. the rail, or its surface). Each camera may be positioned at or near a position of each laser to obtain images of a surface or the point of interest of the rail which is associated with reflected radiation. The imaging unit may obtain image data having at least around 5 megapixels, and more preferably, 12 megapixels, and still more preferably 30 megapixels. Any suitable camera equipment may be used to collect the images. The system may further comprise a plurality of georeferenced video cameras to view the surveyed area and surrounding objects as the vehicle travels along its trajectory (the survey route).

Images may be captured at intervals of 0.5-1.5 m along the track, preferably, 0.09 m during the pass of the vehicle moving at an average speed of 150-200 km/h over the track. The imaging unit may measure coordinates of more than 1,400 laser points per railhead and 500 times per second (500 Hz frequency). The imaging and/or scanning unit can thus be configured via the processor 203 to generate coordinate data for a beam position on the rail surface, e.g. binary data comprising x (longitudinal to the track), y (planar and perpendicular to the track/rail surface) and z (depth or height of the rail from the ground), and/or generate an image showing the laser beam against its surroundings. The position data can then be used by the processor to calculate track geometry corresponding to at least one of a height of the rail above the ground (z direction), the gauge distance between the rails (y direction), the center of a track (y direction), distance between adjacent track lines (x direction), cant (z direction) and so forth. For example, a cant profile over a distance of the track can be mapped by aggregating position data corresponding to a difference in the $z_{xi}$ values of the two rails at consecutive or intermittent x positions (x1, x2, . . . xi) of the track. A height and consequently longitudinal level profile of a constituting rail of the track over a track distance can be obtained by aggregating position data corresponding to $z_{xi}$ of a first rail or $z_{xi}$ of a second rail at consecutive or intermittent x positions (x1, x2 . . . xi) of the track. In case of a gauge profile, a difference of the position data corresponding to $y_{xi}$ of both rails is determined at various positions x1, x2 . . . xi over a distance (length, X km) of the track. The geometry profile may further be expressed in terms of track center line. A track center line is obtained by aggregating, along the expanse of the track (x), center points of each individual gauge distance calculated between respective y coordinates.

Figure 3B:
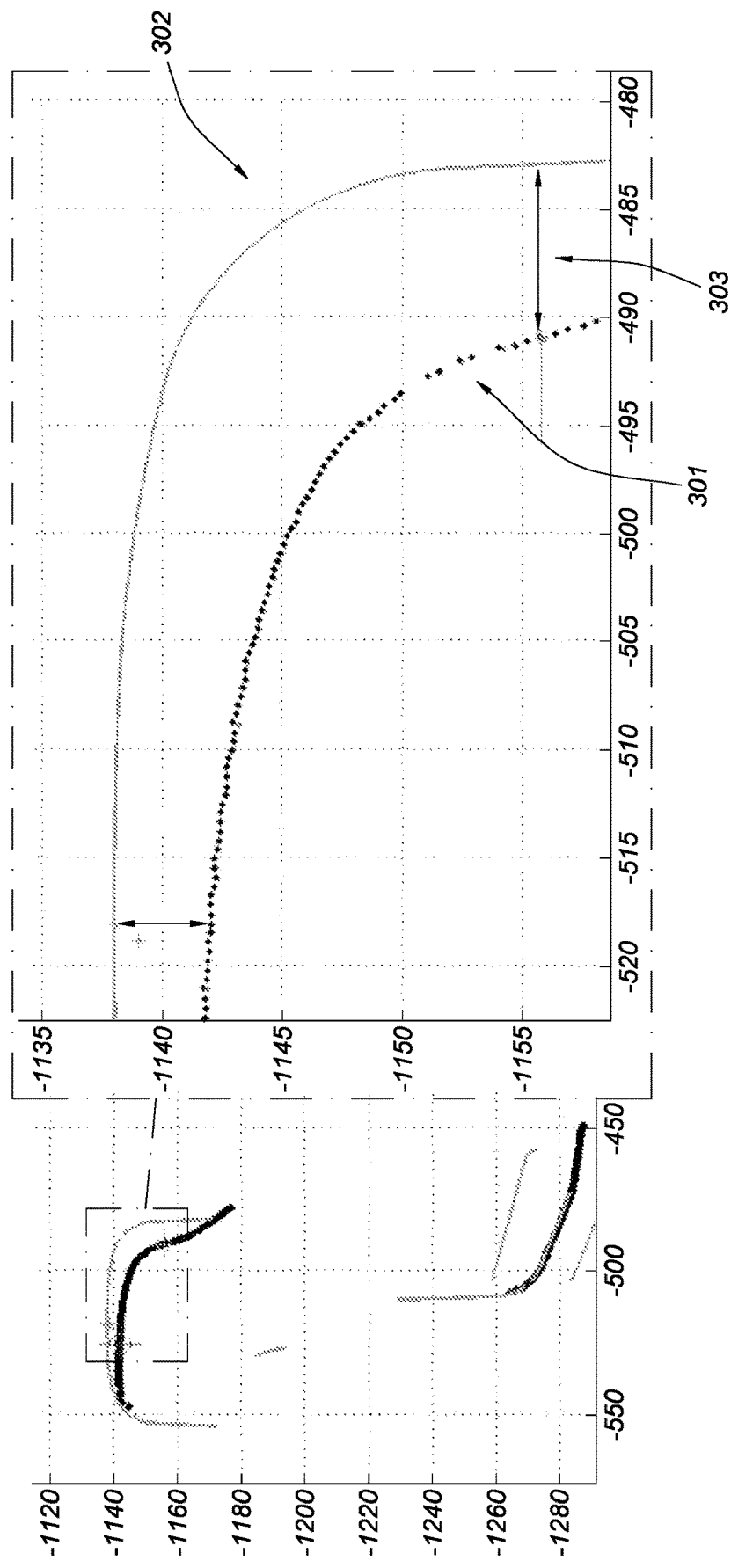
FIGS. 3b-3c show further examples of the method carried out by the system in an embodiment of the invention.

Each captured image of the rail (rail head and/or rail foot) may be combined with data acquired by the GPS/and IMU by the processor to attain geographically referenced 3D positions of the rail, and to further calculate wear of the rail, by comparing the captured images with reference rail images at different locations of the track. FIG. 3b shows an example of an image (301) acquired by the imaging and/or scanning unit which is compared against a reference (302) at a particular location of the track, and the wear (303) is indicated by a deviation of the current profile with the reference.

In order to increase the field of view, multiple imaging sensors may be employed in the laser imaging unit, and alternatively, or together with a 360 degree LIDAR scanner. In a preferred embodiment, a central imaging sensor may be positioned generally about a rail to be inspected in use, and two imaging sensors, on either side thereof. The central sensor provides a top view of a track in use, whereas the sensors to the side are obliquely angled relative thereto and provide a view of the remainder of the track to each side of the rail. The 360 degree LIDAR scanner detects objects (obstructions) within a radiation zone around the rail vehicle. The scanner may comprise a laser which rotates about a predetermined axis at speeds of 150-200 rotations per seconds. The scanned data of the 360 degree LIDAR scanner is combined with the data acquired by the GPS/and IMU to obtain a 3D point cloud of geographical position associated with the track and the surroundings.

Figure 3C:
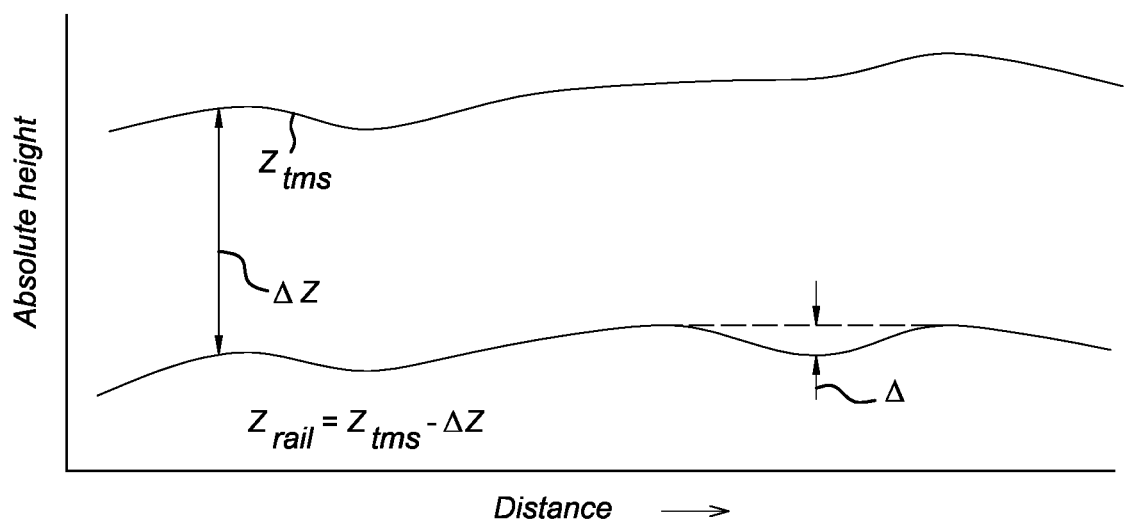

A distance between the track monitoring system and the rail surface along the expanse of the track can further be determined by the processor by comparing coordinate positions of the track monitoring system obtained by the GPS and/or the IMU with the coordinate positions of a rail, as shown in FIG. 3c. A distance variation (A) above a predetermined threshold can be used to determine imperfections in the track.

The measurements of the geographical position of the system by the GPS and/or IMU in combination with the determination of the rail position relative to the system by the laser imaging/scanning unit, allow the processor to determine a 3D geographical position of the rail referenced to the GNSS data, and a corresponding 3D geographically referenced track geometry data with accurate precision.

By aggregating the GPS and/or IMU and measurements of the rail using the laser scanning/and imaging unit (high resolution image data) along the expanse (e.g. length and/or width and/or height) of the track, geographically referenced 3D positions and track geometry profiles can be obtained for a track. The geographically referenced track geometry data may comprise parameters like cant, gauge, track center line etc.

The imaging and/or scanning unit of the track measurement system is configured to rotate about a central axis in order to further acquire 3D position/ranging data of the rails in combination with the surroundings of the track in three dimensions. This produces a three dimensional point map/cloud extracted from reflection data obtained from the rails and objects in the vicinity of the track. As mentioned above, such data is combined with the 3D geographical position acquired by the GPS and/or IMU, resulting in a geographically referenced point cloud of data points, from which corresponding track geometry parameters over the expanse of the track are calculated. Such track geometry data obtained from the point cloud position data may be matched/compared with the geographically referenced track geometry data to improve accuracy of rail geometry measurements.

In an embodiment, a track survey may be repeated by operating the vehicle multiple times (e.g. 3-4 passes) on a specific trajectory/track. Each pass of the vehicle on the track yields a geographically referenced 3D point cloud of data, from which track geometry profiles, e.g. track center lines, can further be calculated, and compared/matched with the track geometry, e.g. track center lines, associated with the reflection data from the rail in combination with the position data from the GPS and/or IMU. Although not essential to the invention, data acquired via such multiple passes may further improve accuracy of the geographical positions of the rail and thus the geographically referenced track geometry data.

The calculation of the center of the track is particularly effective in merging track geometry profiles or LIDAR point clouds, collected over multiple measurements of a track. Since the distance from the track center (reference) to either rail should be constant or substantially constant, the comparison result detects track misalignment if the distance between the center and either rail shows deviation above a threshold.

Other track geometry profiles like gauge, cant, longitudinal level can be matched on a similar basis, and obtained to improved precision. Track geometry measurements can be carried out with accuracies +/−0.5 mm deviation per 10 m measurements. Each geographically referenced 3D point cloud measurement is matched with the geographically referenced rail data to obtain a highly accurate geographically referenced position of the track. Using the method, the positions of the rail can be determined to a precision of deviation less than 8 mm in the x and y directions, and a deviation less than 12 mm in the z direction. The obtained absolute track geometry profile and track position may serve as reference for determinations of track geometry values of the track at a later time period. Additional surveys of the track may be undertaken, e.g. on a monthly basis. Each survey produces the above mentioned geographically referenced positions of the rails and associated track/rail geometry data, which are updated on a regular basis.

Figure 4:
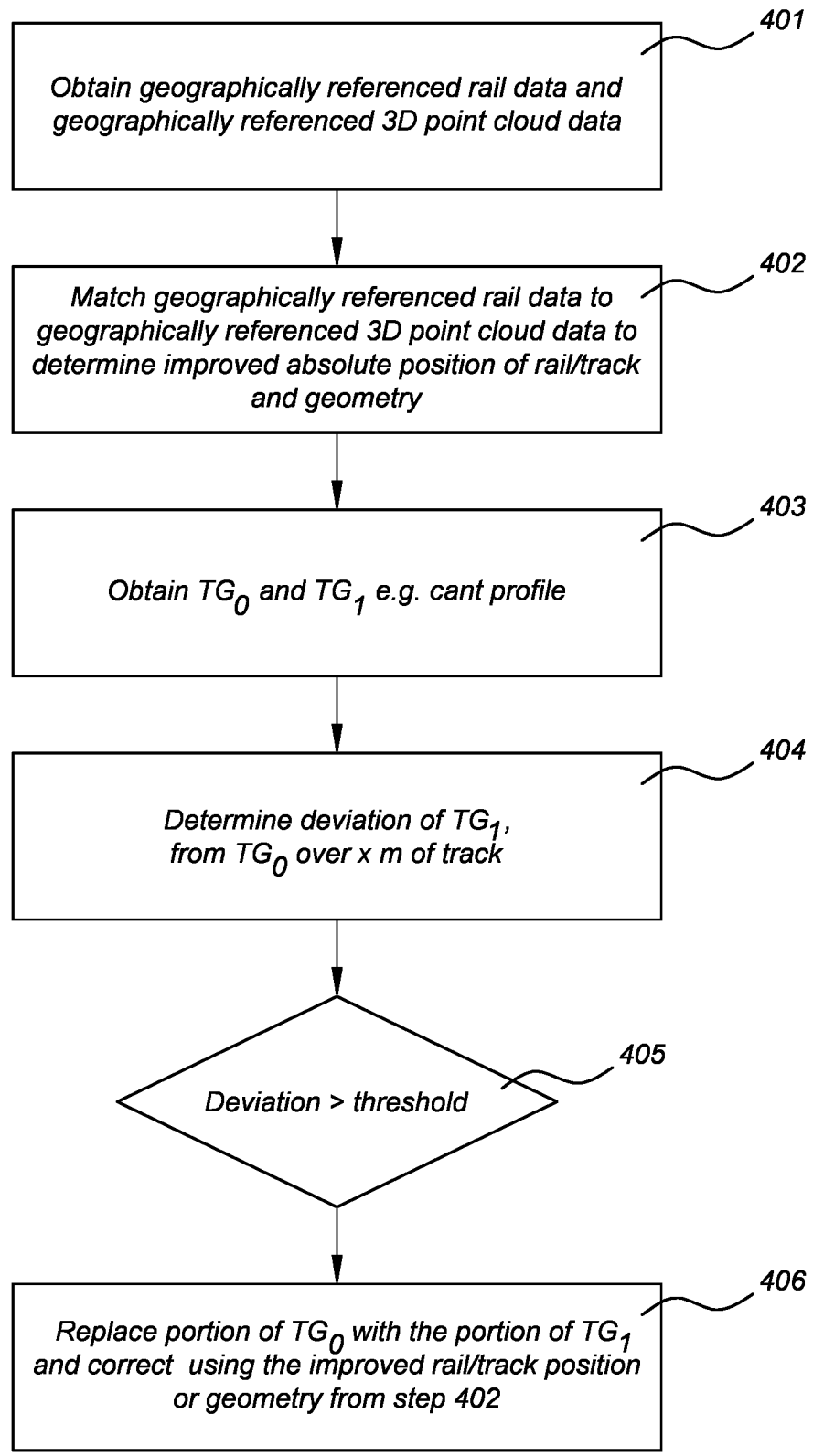
FIG. 4 shows the flowchart for updating track geometry profile according an embodiment of the invention.

FIG. 4 shows the flowchart for updating track geometry profile according an embodiment of the invention.

As mentioned above, the measurements of the geographical position of the system by the GPS and/or IMU may be combined with the rail position determined relative to the system by the laser imaging/scanning unit, to determine a 3D geographical position of the rail referenced to the GNSS data, and a corresponding 3D geographically referenced track geometry data (profile).

The system is moved along the track in a first pass/measurement run to obtain a first measurement of the 3D geographically referenced track geometry profile TG0 of the track. At a later point of time, e.g. in an interval of a month, a second measurement run is undertaken to obtain a second geographically referenced track geometry profile TG1 of the track.

If the processor determines that the geographically referenced track geometry profile acquired during the second measurement run of the rail track has varied with respect to that of a first measurement run, e.g. is higher than a predetermined threshold, it detects a discrepancy in the track geometry parameter at the particular location (x) or locations (x1, x2 . . . xi) of the track.

As an example, a cant difference of 2.5 mm measured over a length 20 m of the track is considered as a discrepancy or 'track changed'.

It is further determined at which position or positions of the track (e.g. X m) said change in the profile is located. The first cant profile TG0 in said X m of the track is replaced with a portion of the second cant profile which lies in the X m of the track. In an embodiment, if the deviation between the first (old) and the second (new) profile is higher than the predetermined threshold at a particular track distance (X m), the processor replaces the portion of the old track geometry profile at the particular track distance with the new profile in order to reflect the current state of the track. The new data may be fit/merged to the old data using any suitable fitting program. The resulting merge comprises the new data on the changed track section and old data on the unchanged section, resulting in an updated first track geometry profile measurement.

Alternately, or in addition thereto, the part of the geographical position of the rail, obtained by combining scanned data of the rail and data collected by the GPS and/or IMU in the first measurement run, is replaced by the geographical position of the rail obtained in the second measurement run. The method thus provides an updated geographical position data of the track, and an overview of how the track position and thus track geometry has changed between the measurement periods. Further, the resources which are otherwise required for updating entire sets of track data can be effectively utilized by replacing the relevant parts of the first track geometry profile.

As described above, the three dimensional point map/cloud extracted from reflection data obtained from the rails and objects in the vicinity of the track is combined with the 3D geographical position acquired by the GPS and/or IMU, resulting in a geographically referenced point cloud of data points with improved accuracy, from which corresponding track geometry parameters over the expanse of the track are calculated. Such track geometry data obtained from the point cloud position data may be matched/compared with the geographically referenced track geometry data to improve accuracy of track geometry data.

Once the updated first track geometry profile is obtained, the updated/replaced changed-track-segments can be brought to required level of geographical position/track geometry accuracy using the improved geographically referenced position of the rail/track and the corresponding geographically referenced track geometry determined by matching the geographically referenced 3D point cloud measurement with the geographically referenced rail data.

For example, a distance between adjacent track lines/track distance which are calculated from the obtained geographical position of the rail may be used for correction of data. In a preferred embodiment, as part of correcting the merged track geometry using the track distance values, the number of tracks comprised in a predetermined length of the track obtained using a geographically corrected measurement of the 360 degree laser scanner (point cloud data) and the image acquisition unit may be compared and determined if they are identical in number. Locations of the track with a mismatch in number of tracks are ignored for further processing.

Thereafter, those track geometry values, e.g. in this case, the distance between adjacent track lines/track distance, which may be derived from geographical positions of the rail/track obtained following an incorrect measurement of the position and attitude measurement unit (GNSS/GPS) are excluded from the data set. Such inconsistencies usually occur at locations of the track involving a switch. This is done by an initial check of a residual error while calculating the track geometry data by comparison of the geographically referenced 3D point cloud data and the geographically referenced rail data. It is determined whether a residual error exceeds a threshold at at least a location of the rail/track, and if yes, the track geometry value at the point is excluded from the reference track geometry data used for the track geometry update. This improves the accuracy of the update by compensating for scenarios where relatively less reliable GNSS data may be at disposal at certain locations of the track.

Further, the differences between geographically referenced track distances calculated using the point cloud measurements (360 degree scanner) and the image acquisition unit are minimized using predetermined allowed absolute position standard deviations. The order at which the steps are carried out is irrelevant to the functioning of the method. In case the reference track distance (profile) for the update is measured by aggregating values from multiple passes of the vehicle on the track, a further step incorporating correction of deviation of the profiles in different runs may further be carried out.

As described above, the system may acquire high resolution images of the track during a measurement run, from which a relative rail position profile may also be determined. From each relative rail position profile, the corresponding track geometry parameters may be calculated, which may be updated in a further measurement run. The processor may be configured to update such track geometry using the improved geographically referenced position of the rail/track using the method.

Due to the accurate geographical position of the rail obtained by the system, the track geometry profiles obtained from different measurement runs can be easily overlaid on top of each other with negligible shift in position between the track geometry profiles. The correction of the updated data using the improved geographically referenced position of the rail/track and/or the geographically referenced track geometry enables an update of the track quality parameters with required accuracy using just a single measurement run. The system thus enables update of track geometry parameters to be carried out at frequent intervals, and monitoring the quality (e.g. degradation) of tracks more efficiently.

The updated and improved track geometry is transmitted via communication unit (not shown) to a remote computer (user computer), or stored in a storage medium located either integrally or distributed from the track monitoring system.

In an embodiment, in addition to processing the measurements of the GPS and the imaging units, the data may be pre-processed and transmitted to a centralized computing system. A separate communications unit may be included in the track monitoring system for the same. The communications device may be a wireless device which can wirelessly communicate collected data or a radio frequency (RF) transmitter that transmits in and according to one or more commercial cell frequencies/protocols (4/5G) to a remote receiver. The computing system may be an external entity or may be incorporated as part of the system. It may also be a server at a remote location. This reduces the load on the system to process the large amount of data associated with the track measurements.

The data storage medium or memory may be electrically connected to the GPS and/or imaging units and configured to store the image and/or position data. The data storage medium may include one or more computer hard disk drives, removable drives, magnetic drives, read only memories, random access memories, flash drives or other solid state storage devices, and the like. Optionally, the data storage device may be disposed remote with the central computing system.

While the invention has been particularly shown and described with reference to a certain exemplary embodiments thereof, it will be understood by those of ordinary skill in the art that various changes in form and detail may be made therein without departing from the scope of the present invention as defined by the appended claims thereof.

The invention claimed is:

1. A track monitoring system for mounting to a vehicle on a track comprising at least one rail, the track monitoring system comprising:
   a position and attitude measurement unit configured to determine a geographical position and attitude of the track monitoring system during at least one pass of the vehicle on the track;
   a storage medium for storing track geometry data;
   a laser imaging and/or scanning unit configured to determine a position of the at least one rail relative to the track monitoring system, and a position of the at least one rail and surroundings relative to the track monitoring system during the at least one pass;
   a processor configured to:
      determine, in the at least one pass, a first geographically referenced rail position based on the geographical position and attitude of the track monitoring system and the position of the at least one rail relative to the track monitoring system;
      determine, in the at least one pass, a second geographically referenced rail position based on the geographical position and attitude of the track monitoring system and the position of the at least one rail and surroundings relative to the track monitoring system;
      determine a third geographically referenced rail position based on the first and the second geographically referenced rail positions, and corresponding geographically referenced track geometry data;
      acquire, in a further pass, track geometry data associated with each position of the rail relative to the rail track monitoring system, and the output of the position and attitude measurement unit;
      update, based on the third geographically referenced position of the rail, the track geometry data acquired in the further pass, and
      store updated track geometry data to the storage medium.

2. The track monitoring system of claim 1, wherein the processor is configured to determine the first geographically referenced rail position based on light reflected from the at least one rail, and the second geographically referenced rail position based on light reflected from the at least one rail in combination with the surroundings of the at least rail, over an expanse of the track.

3. The track monitoring system of claim 1, wherein the processor is configured to update the track geometry data by:
   obtaining a second set of track geometry data in another pass at a later time period; and
   replacing a portion of the track geometry data with a portion of the second track geometry data.

4. The track monitoring system of claim 3, wherein the replacing a portion of the track geometry data with the portion of the second track geometry data comprises:
   determining that the portion of the second track geometry data deviates from the portion of the track geometry data, and
   determining whether the deviation exceeds a predetermined threshold value;
   replacing, if the deviation exceeds a predetermined threshold value, the portion of the track geometry data with the portion of the second track geometry data.

5. The track monitoring system of claim 4, wherein the processor is configured to correct the updated track geometry data using the geographically referenced track geometry data corresponding to the third geographically referenced position of the rail.

6. The track monitoring system of claim 3, wherein the replacing a portion of the track geometry data with the portion of the second track geometry data comprises:
   determining that the portion of the second track geometry data deviates from the portion of the first track geometry data, and
   whether the deviation exceeds a predetermined threshold value;
   replacing, if the deviation at the at least one position of the track exceeds a predetermined threshold value, the geographical position of the rail based on the geographical position of the system and the position of at least one rail relative to the system and corresponding to the portion of the track geometry data, with the geographical position of the rail based on the geographical position of the system and the position of at least one rail relative to the system and corresponding to the portion of the second track geometry data.

7. The track monitoring system of claim 6, wherein the processor is configured to correct the updated geographical position of the rail using the third geographically referenced position of the rail.

8. The track monitoring system of claim 1, wherein the position and attitude measurement unit comprises an inertial measurement unit which is configured to provide the attitude of the system.

9. The track monitoring system of claim 1, wherein the processor is further configured to correct the determined geographical position and the attitude of the track monitoring system.

10. The track monitoring system of claim 1, wherein the laser imaging and/or scanning unit comprises at least one laser configured to irradiate another rail.

11. The track monitoring system of claim 1, wherein the processor is configured to transmit the third geographical position of the rail to an external computing system, and receive the updated track geometry data from the computing system.

12. The track monitoring system of claim 10, wherein the processor is configured to determine a center line of the track, a distance between adjacent track lines, a cant, a gauge, a longitudinal level as the track geometry data.

13. A method for monitoring a rail track, the method executed by a track monitoring system mounted to a vehicle, and including the steps of:
   determining a geographical position of the system during at least one pass of the vehicle on the track;
   determining a position of at least one rail relative to the track monitoring system, and a position of the at least one rail and surroundings relative to the track monitoring system during the at least one pass;
   determining, in at least one pass, a first geographically referenced rail position based on the geographical position of the system and the position of at least one rail relative to the system;
   determining, in the at least one pass, a second geographically referenced rail position based on the geographical position of the track monitoring system and the position of the at least one rail and surroundings relative to the track monitoring system;
   determining a third geographically referenced rail position based on the first and the second geographically referenced rail positions, and a corresponding geographically referenced track geometry data;

acquiring, in a further pass, track geometry data associated with each position of the rail relative to the track monitoring system, and the output of the position and attitude measurement unit;

updating, based on the third geographically referenced position of the rail, the track geometry data acquired in the further pass, and storing updated track geometry data to a storage medium.

14. A track monitoring system for mounting to a vehicle on a track comprising at least one rail, the track monitoring system comprising:

a position and attitude measurement unit configured to determine a geographical position and attitude of the track monitoring system during at least one pass of the vehicle on the track;

a storage medium for storing track geometry data;

a laser imaging and/or scanning unit configured to determine a position of the at least one rail relative to the track monitoring system, and a position of the at least one rail and surroundings relative to the track monitoring system during the at least one pass;

a processor configured to:

determine, in the at least one pass, a geographically referenced rail position, wherein the geographically referenced rail position is based on (i) the geographical position and attitude of the track monitoring system, (ii) the position of the at least one rail relative to the track monitoring system; (iii) surroundings relative to the track monitoring system; and (iv) corresponding geographically referenced track geometry data;

acquire, in a further pass, track geometry data associated with each position of the rail relative to the track monitoring system, and the output of the position and attitude measurement unit;

update, based on the geographically referenced rail position, the track geometry data acquired in the further pass, and store updated track geometry data to the storage medium.

* * * * *